United States Patent [19]

Schroeder et al.

[11] Patent Number: 5,132,909

[45] Date of Patent: Jul. 21, 1992

[54] APPARATUS FOR DIAGNOSING INDIVIDUAL CYLINDER PERFORMANCE BY ESTIMATED INSTANTANEOUS ENGINE SPEEDS

[75] Inventors: Thaddeus Schroeder, Rochester Hills; Cristi A. Martabano, Bloomfield Hills, both of Mich.; Rodger B. Evans, Nashville, Tenn.; Robert A. Dalley, Utica, Mich.

[73] Assignee: Saturn Corporation, Troy, Mich.

[21] Appl. No.: 559,852

[22] Filed: Jul. 30, 1990

[51] Int. Cl.⁵ .................. G01L 3/26; G01M 15/00
[52] U.S. Cl. .................. 364/431.03; 73/116; 73/117.3; 364/431.01; 364/550
[58] Field of Search ............ 364/431.03, 431.07, 364/431.08, 431.01, 550, 551.01; 73/116, 117.3; 123/418, 419, 436

[56] References Cited

U.S. PATENT DOCUMENTS

| | | | |
|---|---|---|---|
| 4,539,841 | 9/1985 | Schroeder et al. | 73/116 |
| 4,562,728 | 1/1986 | Timmerman | 364/431.03 X |
| 4,697,561 | 10/1987 | Citron | 364/431.07 X |
| 4,893,244 | 1/1990 | Tang et al. | 364/431.03 |
| 4,932,379 | 6/1990 | Tang et al. | 73/117.3 X |
| 5,040,412 | 8/1991 | Wannenwetsch | 364/431.07 X |
| 5,041,980 | 8/1991 | Maddock et al. | 364/431.03 |

Primary Examiner—Parshotam S. Lall
Assistant Examiner—Edward J. Pipala
Attorney, Agent, or Firm—Howard N. Conkey

[57] ABSTRACT

An engine equipped with a low resolution crankshaft rotation encoder is diagnosed by measuring the average speeds for each encoder period, deriving estimated instantaneous speeds for top dead center (TDC) positions for each cylinder and for the points midway between TDCs. Speed changes calculated from the estimated speeds for the compression and combustion phases of each cylinder provide measures of the compression and power output of each cylinder. An engine speed signature trace derived from the estimated speeds is displayed to reveal speed changes and a composite display of several consecutive signatures provides further information.

15 Claims, 5 Drawing Sheets

APPARATUS FOR DIAGNOSING INDIVIDUAL CYLINDER PERFORMANCE BY ESTIMATED INSTANTANEOUS ENGINE SPEEDS

FIELD OF THE INVENTION

This invention relates to a method of analyzing cylinder performance in an internal combustion engine and particularly to such a method which makes use of a low resolution engine rotation sensor.

BACKGROUND OF THE INVENTION

The diagnostic connector on automobiles permits service personnel to quickly diagnose problems related to the operation of on-board sensors and microcomputers. There is a need, however, for the capability to diagnose individual cylinder performance, that is, to identify misfiring or otherwise under performing cylinders. Such information, in the form of compression pressure and power output values for each cylinder, can be obtained from engine speed variations caused by the compression and power strokes of each cylinder.

The U.S. Pat. No. 4,539,841 to Schroeder et al, entitled "Method of Determining Engine Cylinder Compression Pressure and Power Output", teaches how for a given engine, at a predetermined engine speed and load, the peak compression pressure and the cylinder power output can be closely estimated from instantaneous engine speed at properly selected crank angles. As taught in the patent, however, the method requires a fairly high resolution encoder to generate acceptable instantaneous speed data (e.g., the speed should be measured over a crank angle smaller than about 4°). In practice it means a separate speed sensor has to be used to collect speed data from the ring gear.

It is strongly preferred to obtain the necessary information without a separate speed sensor. Low resolution sensors are commonly used on engines for ignition timing and are capable of delivering a speed sample each 60° or 30°, for example.

SUMMARY OF THE INVENTION

It is therefore an object of the invention to derive meaningful compression and power output information without a high resolution sensor and particularly to obtain such information from standard speed sensors used for timing purposes. It is another object to present the diagnostic data is a useful way and to easily store the data.

The invention is carried out by a method of diagnosing individual cylinder performance of an internal combustion engine wherein for a properly operating engine the engine speed reaches a minimum near the top dead center of each cylinder and a maximum speed at a point approximately midway between the top dead center of consecutive cylinders in the firing order comprising the steps of: sampling the average speed for periods spanning the midway points between top dead centers, sampling the average speed for periods near the top dead centers, and formulating an engine speed signature comprising estimated midway speeds and top dead center speeds for each cylinder by setting each midway speed equal to the corresponding midway average speed and calculating each top dead center speed from an adjacent midway average speed and the average speed for a period intervening the midway point and the top dead center.

BRIEF DESCRIPTION OF THE DRAWINGS

The above and other advantages of the invention will become more apparent from the following description taken in conjunction with the accompanying drawings wherein like references refer to like parts and wherein.

DESCRIPTION OF THE INVENTION

The diagnostic method set forth in the ensuing description was specifically developed for a four cylinder gasoline engine with a fuel injector for each cylinder and having a sensor which delivers six pulses per crankshaft revolution (6× encoder). It will be understood, however, that the method applies equally well to engines with six or eight cylinders, for example, using 6×, 12×, 18× or 24× encoders, with suitable adjustments to suit the number of cylinders and the type of encoder.

Figure 1:
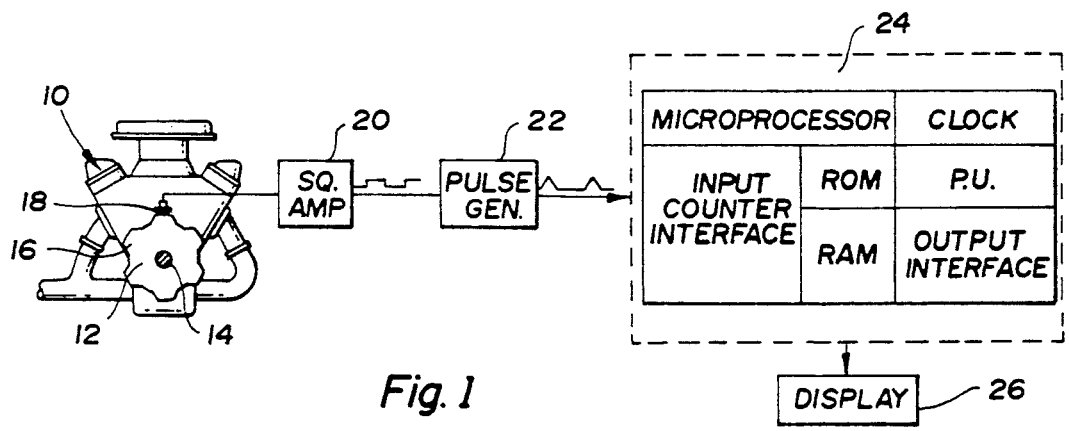
FIG. 1 is a schematic diagram of an engine, a diagnostic tool and display for determining compression and power parameters of each cylinder according to the invention.

Referring to FIG. 1, an engine 10 includes an encoder 12 mounted on and rotated by the engine crankshaft 14 and which has teeth 16 equally spaced around its circumference at 60° intervals. An electromagnetic speed sensor 18 positioned adjacent the path of the teeth 16 senses the passing of the teeth as the crankshaft 14 is rotated and provides an alternating output to a zero crossing responsive square wave amplifier 20 whose output is a square wave signal at the frequency of the alternating input from the speed sensor 18. This square wave signal is provided to a pulse generator 22 which provides a pulse output with the passing of each tooth of the encoder 12. Therefore the time interval between pulses is inversely proportional to engine speed and the frequency of the pulses is directly proportional to engine speed.

A conventional computer 24 receives the pulses developed by the pulse generator 22. The computer 24 is comprised of a microprocessor, a clock, a read-only memory, a random access memory, a power supply unit, an input counter interface and an output interface. The computer 24, upon a manual input command or upon sensing certain engine conditions, executes an operating program stored in its read-only memory. This program includes steps for reading input data and timing intervals via the input counter interface, processing the input data and providing for an output such as to a display 26 via the output interface. The display 26 may take the form of a printer or a video monitor for displaying various information relating to the diagnostic procedure.

Figure 2:
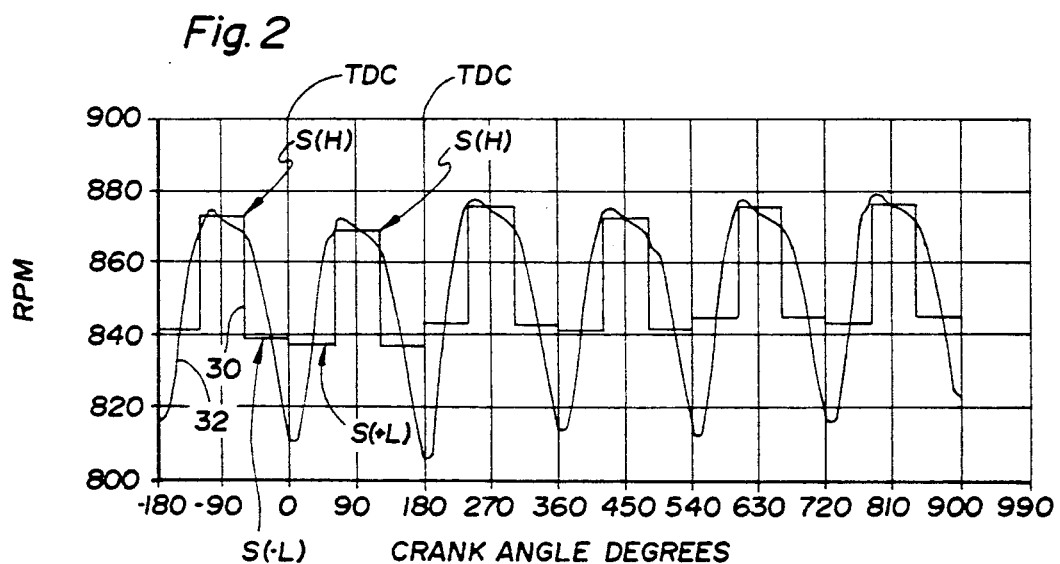
FIG. 2 is a graph of a high resolution speed trace and a low resolution speed trace for several cylinder events.

By measuring the interval between pulses and calculating the average speed for each interval, a low resolution trace of engine speed is obtained as shown in FIG. 2 by the trace 30 which is registered with scale markings for the engine rotation angle where 0° coincides with the top dead center (TDC) of one cylinder and each 180° increment corresponds to the TDC of another cylinder. The trace 30 is made up of a succession of 60° samples each aligned with an angular period and representing the average speed over that 60° period. The speed samples cover intervals immediately before and after TDC, respectively denoted S(−L) and S(+L) since they are relatively low values for a normally operating engine, and a relatively high sample S(H) which occurs in an interval midway between TDC of successive cylinders.

A high resolution speed trace 32 derived from speed samples taken every 4° of crank rotation is superimposed on the FIG. 2 graph to reveal the relationship of the low resolution trace 30 to actual engine speed. For normal operation the lowest speeds shown by the trace occur at about the TDC of each cylinder and the highest speed is about midway between TDCs or 90° before or after TDC. More precisely, the actual speed peaks shortly before the 90° position and the speed at the 90° position is about equal to the measured average speed S(H) at the midway point.

Figure 3:
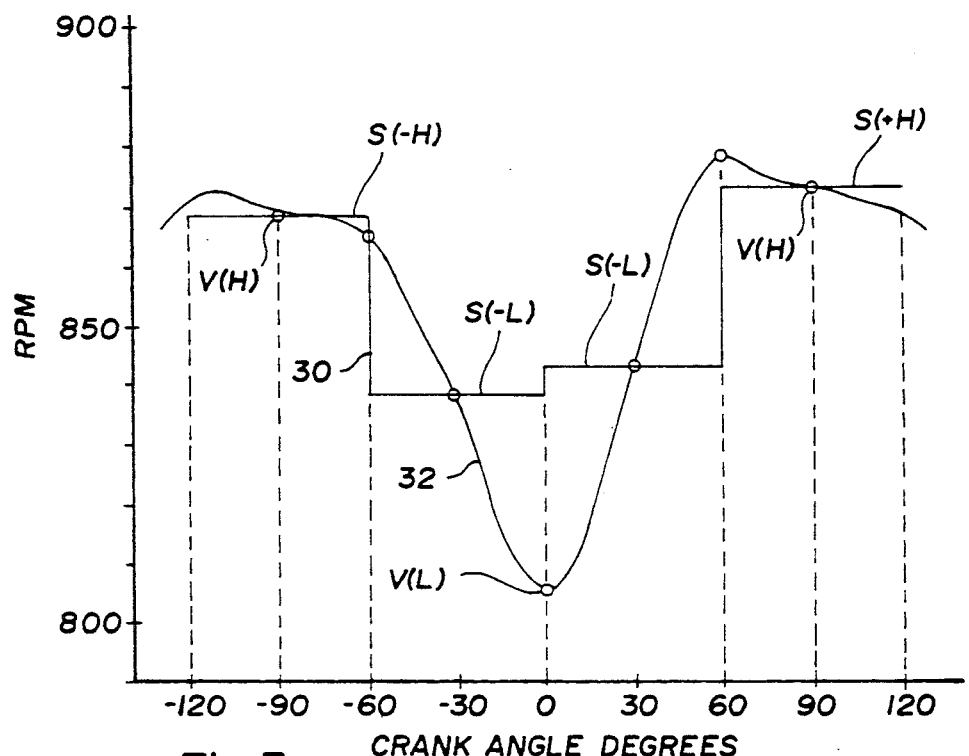
FIG. 3 is a graph of a high resolution speed trace and a low resolution speed trace for one cylinder event.

The method of the invention requires that the instantaneous speed of the engine at TDC and midway between TDCs be estimated from the low resolution trace 30. As described above, the estimated speed V(H) at the midway position can be set equal to the average speed for that period or V(H)=S(H). This is better shown in FIG. 3 which is an enlarged view of the speed traces from −120° to +120° crankshaft rotation. When referring to a single cylinder, the two midway speeds V(H) are conveniently denoted as V(−H) for the point before TDC and as V(+H) for the point after TDC. Of course the speed V(+H) for one cylinder is the same as the speed V(−H) for the next cylinder. In the same manner the notation for S(H) may be specified as S(−H) or S(+H). In FIG. 3 it should be noted that the speed curve 32 at −60° is fairly close to the midway average speed S(−H) and that the trace 32 between −60° and 0° is nearly linear. Since the average speed for the period between −60° and 0° is the measured value S(−L), the low value on the curve 32 can be estimated from the relationship $$S(-L)=[S(-H)-V(L)]/2,$$

where V(L) is the estimated low speed at TDC. The equation may be restated as $$V(L)=2*S(-L)-S(-H).$$

Slightly different results are obtained by using the estimated speed S(+H) for 90° and the average speed S(+L) for the period 0° to 60° to arrive at the equation $$V(L)=2*S(+L)-S(+H).$$

Both equations for estimating V(L) provide very good estimates, especially in a properly operating engine, in which case the difference between the estimated and actual values is only 1 or 2 RPM amounting to an error of a fraction of a percent. If one of the cylinders malfunctions, the V(L) for that cylinder is overestimated by about 1%. The values of V(L) for the remaining, properly functioning cylinders are now underestimated by about 1%, except for the cylinder which is next in the firing order after the malfunctioning one. For this cylinder, the V(L) value can be up to 3.5% below the actual value. These estimation errors are quite tolerable for diagnostic purposes especially since they tend to accentuate the fault related information.

Figure 4:
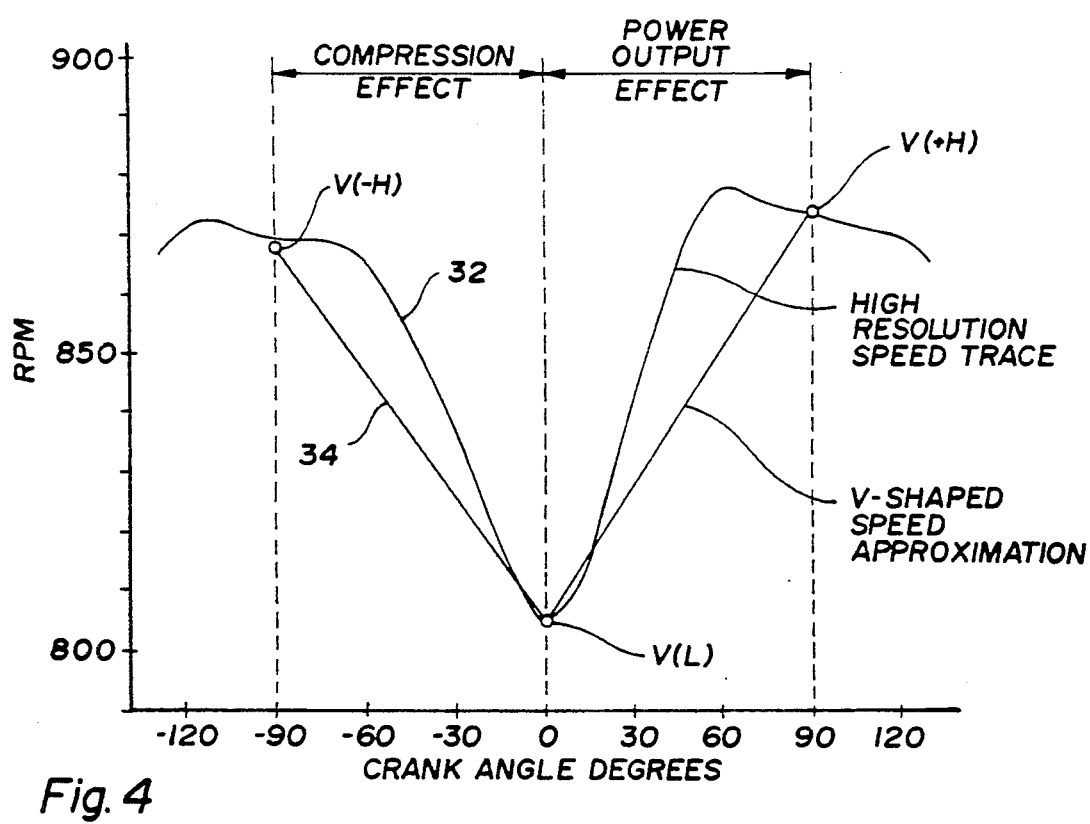
FIG. 4 is a graph of a high resolution speed trace for one cylinder event and an estimated approximation of the speed trace derived from a low resolution speed trace, according to the invention.

For a single cylinder, as shown in FIG. 4, the actual speed trace 32 is replaced by a V-shaped estimated trace 34. The midway speed before TDC V(−H), the speed at TDC V(L) and the midway speed after TDC V(+H) define the trace and contain sufficient information to analyze cylinder performance. The compression of the cylinder determines the slope of the trace before TDC and thus the difference of V(−H) and V(L) reveals information about compression. A variety of equations can be constructed to extract that information in one form or another. For example, relative compression RCP is determined by $$RCP=100\%*[V(-H)-V(L)]/V(L).$$

In a similar manner the difference between V(+H) and V(L) is a function of the power output of the cylinder. Relative power output is expressed as $$RPO=100\%*[V(+H)-V(L)]/V(L).$$

Negative, or distinctly lower values of RCP and/or RPO for a particular cylinder in comparison with those of the other cylinders indicate a compression or a combustion problem in that cylinder. In a well running engine the values of RCP and RPO are very close, and are in the range of 2% to 8% depending on engine calibration and operating conditions.

Figure 5:
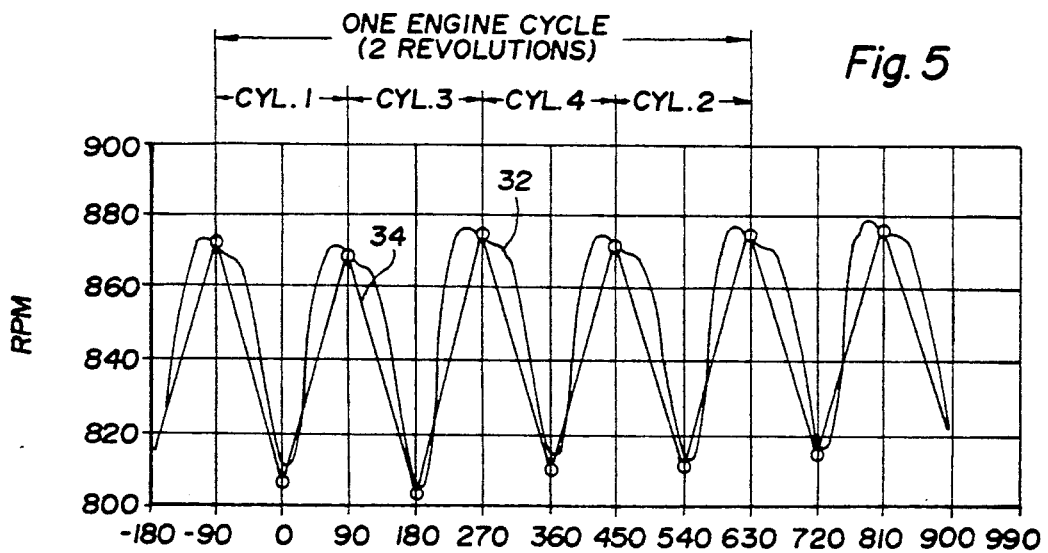
FIG. 5 is a graph of a high resolution speed trace and an engine speed signature for an engine cycle.

Calculating and displaying the compression and power output values reveals useful information about cylinder performance especially for grossly malfunctioning cylinders. A speed trace available for visual inspection, however, would reveal less distinct faults. A diagnostic speed trace can be built from the estimated speeds V(H) and V(L). A speed trace 34 for a complete engine cycle during proper operation is shown in FIG. 5 overlaid on the actual speed trace 32. The diagnostic speed trace is thus a series of V shaped forms and is here called the engine speed signature. Only nine data points comprising the high and low speed points V(H) and V(L) are required to define the signature for an entire engine cycle in contrast to 180 points needed to define a high resolution speed trace. It is therefore relatively easy to build a library of such signatures linked to a variety of known engine problems. The small number of data points in each signature makes an automatic pattern search very fast and simple. An original speed signature taken when the engine is new could be stored in the engine computer for reference for future service.

Figure 6:
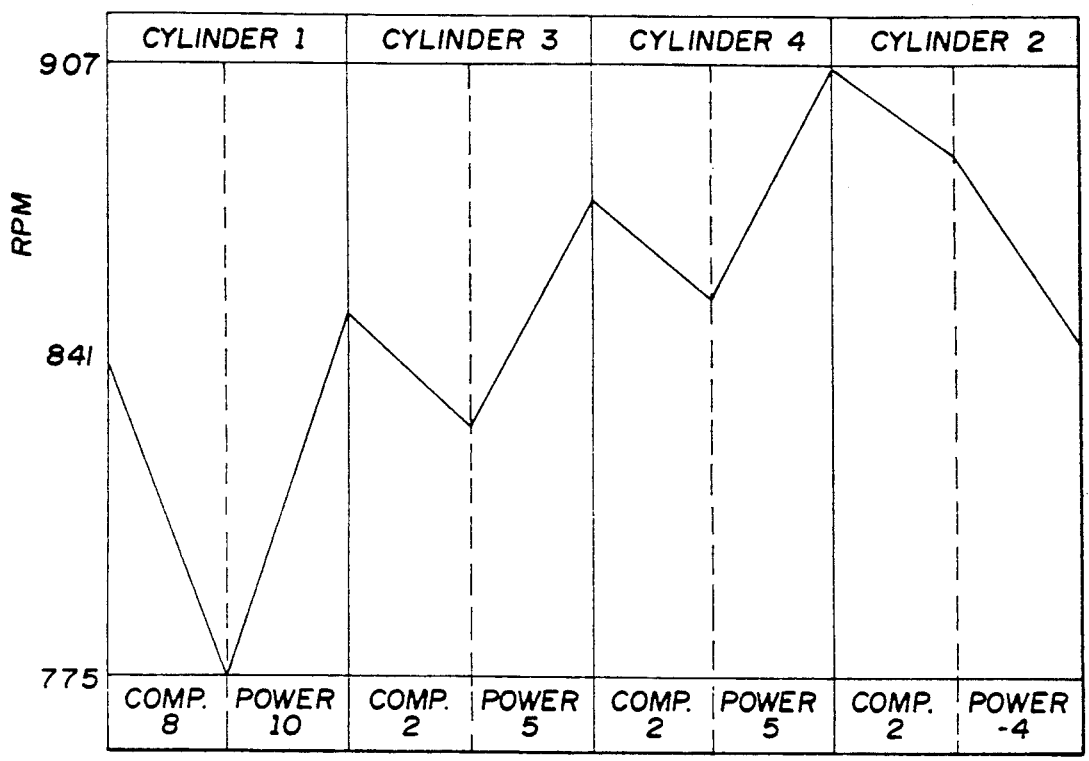
FIG. 6 is a display of an engine signature for a condition of one spark plug disconnected.
Figure 7:
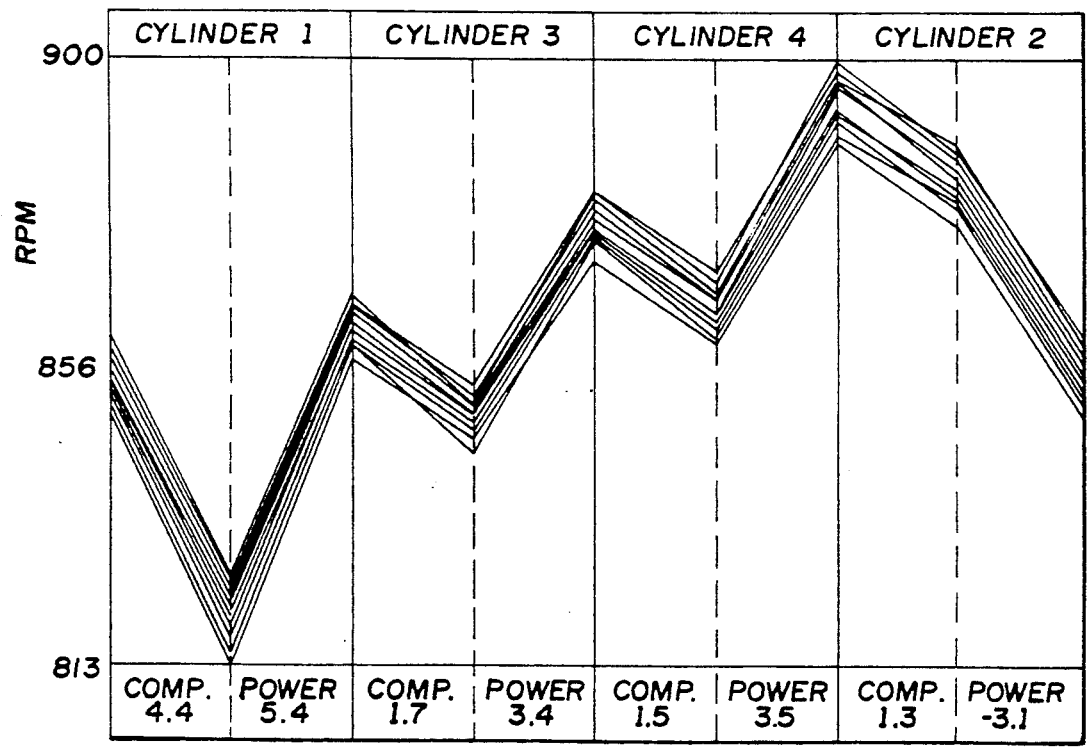
FIG. 7 is a display of a family of engine signatures for a condition of one spark plug disconnected.
Figure 8:
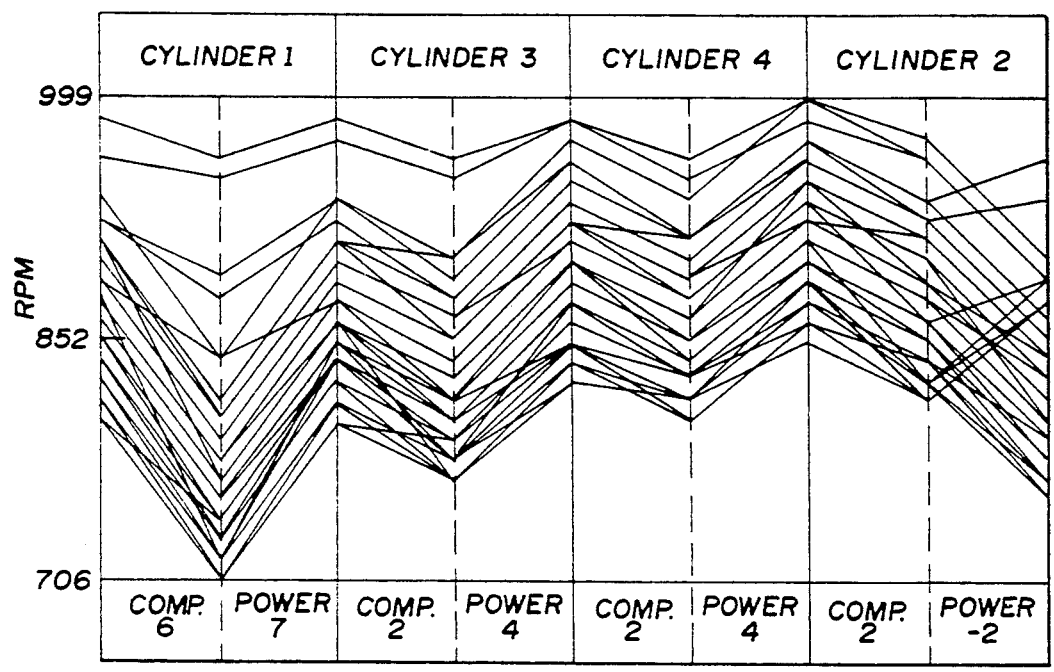
FIG. 8 is a display of an overlay of several engine signatures for the condition of one intermittently misfiring cylinder.

A trace of a speed signature is shown in FIG. 6 for an engine having the spark plug disconnected in cylinder 2. The RCP and RPO parameters for each cylinder are shown as Comp. and Power. The speed after TDC falls off instead of increasing and the power parameter RPO drops to −4 from a normal of 5 for the preceding cylinders. The drop in speed also affects the next cylinder, No. 1, which shows an RPO of 10 due to the gain in engine speed. The same condition is shown in FIG. 7 which is a display of an overlay of 25 consecutive signatures. The same signature shape is shown by each signature, revealing consistent engine operation. The narrow band indicates relatively little speed variation from cycle to cycle. FIG. 8 is an overlay of 25 signatures for an engine having intermittent misfire for cylinder 2. Each misfire results in a speed drop during the power stroke (after TDC) which leads to lower speeds for subsequent cycles. The composite RPO for the cylinder 2 is −2 compared to 4 and 7 for the other cylinders. The overlay of several signatures clearly reveals the intermittent failures of either injectors or ignition.

Figure 9:
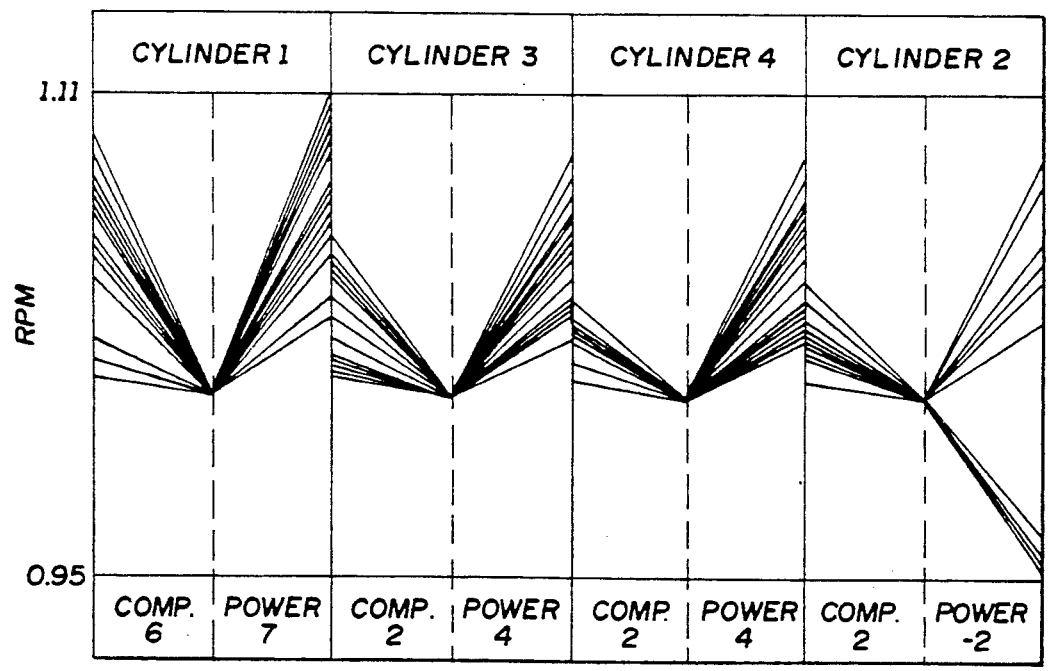
FIG. 9 is a display of an overlay of several normalized engine signatures based on the same data used for the display of FIG. 8.

A particularly useful form of display of speed signatures is provided by normalizing the data for each cylinder to the estimated TDC speed, V(L), and displaying the trace of several normalized speed signatures. This gives the operator very clear indication of the engine operation, especially in the case of intermittent misfires. FIG. 9 is the overlay of normalized signatures for the same data used to generate FIG. 8 signatures. The normalized trace is prepared by dividing V(−H), V(L) and V(+H) by V(L) for each individual cylinder. Then the display value at each TDC is always 1 and the display for each cylinder has a "butterfly" pattern with the spread of each wing pattern revealing the speed variance over the period displayed, so that a very smoothly running engine will have a tight pattern with very little wing "flutter". misfires are instantly revealed as a pattern below the V(L) level as shown for cylinder 2 in FIG. 9.

Figure 10:
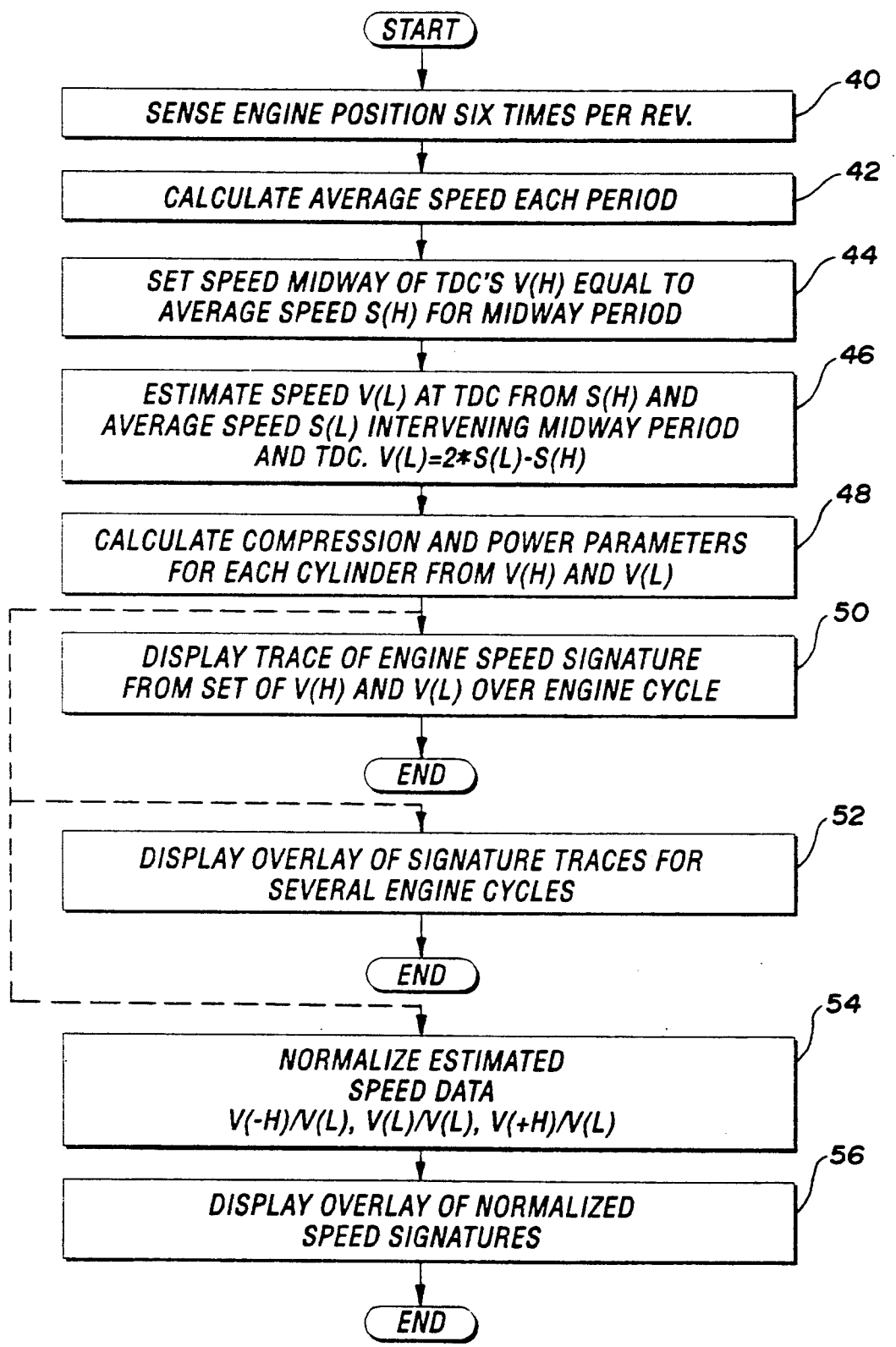
FIG. 10 is a flow chart of the program for carrying out the method of the invention in the computer of FIG. 1.

The method is carried out in the computer 24 by a program represented by the flow chart shown in FIG. 10. The engine speed is sensed (block 40) by receiving the pulses initiated by the crankshaft encoder 12, the average speed is calculated for each period between pulses (block 42), the high speeds V(H) at the midway points are determined from the average speeds S(H) (block 44), the low speeds V(L) at TDCs are calculated (block 46), compression and power out parameters for each cylinder are calculated based on the differences between V(H) and V(L) for the compression and combustion phases, respectively (block 48), the engine speed signature is displayed for one cycle (block 50) or an overlay of several signatures is displayed (block 52). Alternatively, the estimated data is normalized (block 54) and normalized speed signatures are displayed (block 56).

The embodiments of the invention in which an exclusive property or privilege is claimed are defined as follows:

1. An apparatus for diagnosing individual cylinder performance of an internal combustion engine having a crankshaft encoder for providing pulse outputs at predetermined crankshaft positions, the apparatus comprising:
   a computer for receiving pulse outputs from the engine, the computer including a microprocessor, a random access memory, and a read only memory; the read only memory containing an operating program for
   a) sensing engine crankshaft rotational position several time for each engine revolution;
   b) calculating average engine speed for periods defined by the sensing engine positions, the periods at least partly including the beginning of a compression phase of each cylinder, the end of the said compression phase, the beginning of a combustion phase and the end of the combustion phase,
   c) for each cylinder, estimating instantaneous engine speeds from the calculated average speeds by setting a first speed equal to an average speed for a period including the beginning of a compression period of the cylinder, setting a second speed equal to an average speed for period including the end of a combustion period of the cylinder, and deriving a third speed from at least one of the first and second speeds and an average speed measured near top dead center of the cylinder, and
   d) analyzing the performance of each cylinder on the basis of the first, second and third speeds of each cylinder; and
   a display coupled to the computer means for displaying information derived from the said speed signals.

2. The invention as defined in claim 1 wherein the third speed is derived by a linear extrapolation of the speed change from one of the first and third speeds and the measured average speed for a period between the location for said one speed and the top dead center of the cylinder.

3. The invention as defined in claim 1 wherein the display device displays a waveform based on the estimated instantaneous speeds of all the cylinders for observation of comparative speeds in the cylinders.

4. The invention as defined in claim 1 wherein the display device displays the speed data for several engine revolutions by overlaying a consecutive series of waveforms based on the estimated instantaneous speeds of all the cylinders.

5. The invention as defined in claim 1 wherein the third speed (V(L) is derived from an average speed S(−L) measured for the period just prior to top dead center and the first speed V(H) by the equation V(L)=2*S(−L)−V(H).

6. Apparatus for diagnosing individual cylinder performance of an internal combustion engine wherein for a properly operating engine the engine speed reaches a minimum near the top dead center of each cylinder and a maximum speed at a point approximately midway between the top dead center of consecutive cylinders in the firing order comprising:
   means for sampling the average speed S(H) for periods spanning the midway points between top dead centers, means for sampling the average speed S(L) for periods near the top dead centers,
   means for formulating an engine speed signature comprising estimated midway speeds V(H) and top dead center speeds V(L) for each cylinder by setting each midway speed V(H) equal to the corresponding midway average speed S(H) and calculating each top dead center speed V(L) from an adjacent midway average speed S(H) and the average speed S(L) for a period intervening the midway point and the top dead center; and
   a display device coupled to the means for formulating for displaying information derived from the engine signature.

7. The invention as defined in claim 6 wherein the means for formulating includes means for calculating each top dead center speed V(L) by solving the equation V(L)=2*S(L)−S(H).

8. The invention as defined in claim 6 including means for diagnosing cylinder performance from the top dead center speed V(L) of a cylinder and the adjacent midway speeds V(H).

9. The invention as defined in claim 8 wherein the speed V(H) prior to top dead center less the speed V(L) at top dead center comprises a compression parameter for each cylinder.

10. The invention as defined in claim 8 including means for calculating the relative compression of each cylinder as [V(−H)−V(L)]/V(L) where V(−H) is the midway speed occurring prior to top dead center.

11. The invention as defined in claim 8 including means for determining the value of V(H) after top dead center less the value of V(L) at top dead center wherein the resulting difference is a measure of power output of a cylinder.

12. The invention as defined in claim 8 including means for calculating the relative power of each cylinder as [V(+H)−V(L)]/V(L) where V(+H) is the midway speed occurring after top dead center.

13. The invention as defined in claim 6 wherein the display device displays the trace of the signature for an engine cycle for comparison of relative cylinder performance.

14. The invention as defined in claim 6 wherein the display device displays an overlay of traces of the signature for several engine cycles for comparison of relative cylinder performance in different cycles.

15. The invention as defined in claim 6 including means for normalizing the estimated speeds for each cylinder relative to the top dead center speed to yield a normalized signature and wherein the display device displays an overlay of traces of the normalized signature for several engine cycles.

* * * * *